June 16, 1964  E. J. GUILBERT  3,137,181
ANTI-BACKLASH DIFFERENTIAL
Filed April 3, 1962

INVENTOR
EDWARD J. GUILBERT
BY Leonard H. King
ATTORNEY

United States Patent Office 3,137,181
Patented June 16, 1964

3,137,181
ANTI-BACKLASH DIFFERENTIAL
Edward J. Guilbert, 41 Linwood Road S.,
Port Washington, N.Y.
Filed Apr. 3, 1962, Ser. No. 184,745
5 Claims. (Cl. 74—713)

This invention relates to bevel gear differentials and, in particular, to means associated therewith for the elimination of backlash.

As is well known, a bevel gear differential is, in effect, an epicyclic gear train, wherein the motion of the carrier is directly proportional to the sum of the motions of the two bevel gear shafts. The differential motion may be considered the resultant or difference between the original motions. One important area of use is in computing devices where it is necessary to add the effects of several independent variables. The high degree of accuracy required in present day computers, particularly when used in conjunction with missiles or rockets, is well known, but difficult to obtain with any consistency. One source of inaccuracy is the extremely small, compact differential systems generally employed. In any gearing system, and particularly in a bevel gear differential, there will be found some inherent mechanical play or looseness, commonly referred to as "backlash." In addition, even the most carefully fabricated differential system will, with prolonged use, eventually exhibit backlash errors as a result of tooth wear.

Accordingly, it is a prime object of this invention to provide easily assembled and inexpensive anti-backlash means integral with a bevel gear differential.

Another object is to provide self-adjusting anti-backlash means integral with a bevel gear differential.

It is still another object to provide a differential bevel gear assembly that will exhibit zero backlash between inputs and between inputs and outputs for the entire life of the assembly due to the wear-compensating resilient biasing means integral with said assembly.

It is a further object to eliminate the need for fine adjustment of the individual bevel gears associated with the full differential system.

Still another object is to eliminate the need for fine adjustment of the resilient biasing means associated with the full differential system.

Another object is to provide backlash elimination means suitable for incorporation in miniature bevel gear differential systems as used in computers, missilry, etc.

These and other features, advantages and objects of the invention will, in part, be pointed out with particularity and will, in part, become obvious from the following more detailed description of the invention, taken in conjunction with the accompanying drawing, which form an integral part thereof.

Figure 1:
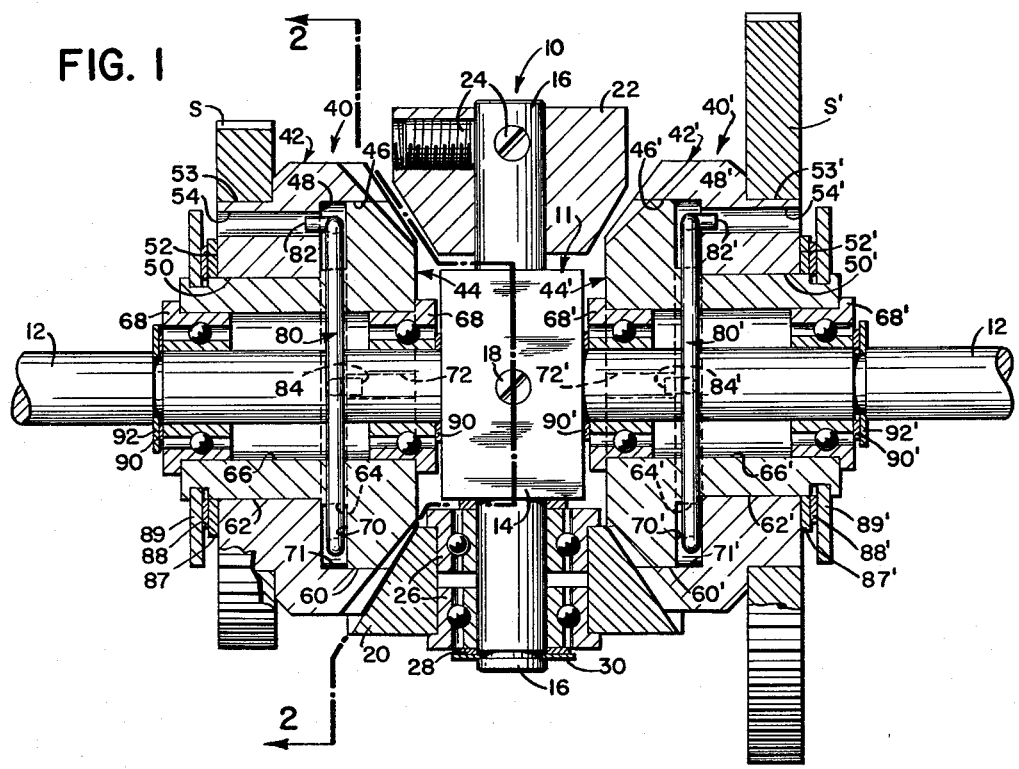
FIG. 1 is an enlarged longitudinal section of a typical bevel gear differential constructed in accordance with the teachings of this invention.

In the drawing there is shown a bevel gear differential assembly 10 having a spider 11 comprising a central shaft 12 and an enlarged rectangular hub 14 substantially at its midpoint and integrally formed thereon. Hub 14 in turn has apertures on two opposing sides to receive cross shaft 16 which is rigidly secured thereto by set screw 18. Shafts 12 and 16 are perpendicular to each other in their common plane.

In FIG. 1 there is shown, rotatably mounted at one end of shaft 16 a bevel pinion 20 and at the other end of shaft 16 a weight or counterbalance 22 rigidly secured by screws 24. Conventional bearings 26, disposed between shaft 16 and pinion 20 assure low friction rotation. It is to be understood that counterbalance 22 may be replaced by one or more bevel pinions similar to 20 suitably mounted for rotation without altering the functioning of the system. Shims or spacer washers 28 and retaining ring 30 complete the assembly and guarantee accurate location of the bevel pinion 20 with respect to the compound, nested bevel gears to be described later.

Since the components comprising the anti-backlash features are identical on both the left hand and right hand side of shaft 12, as viewed in FIG. 1, only the left hand side will be described, the right hand side carrying prime numbers to denote like components.

Figure 2:
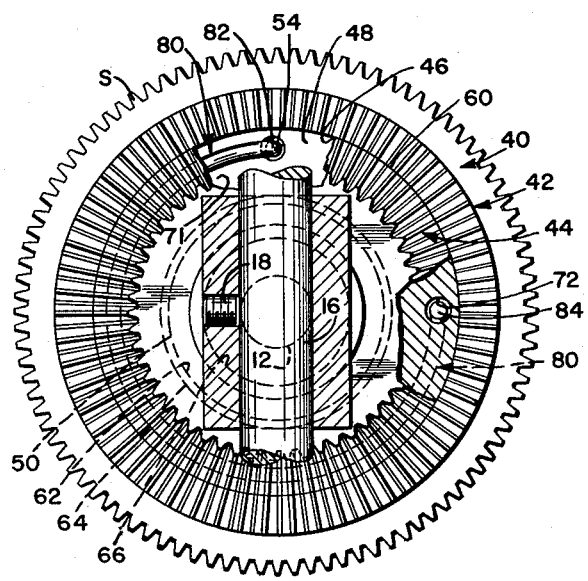
FIG. 2 is a sectional elevation taken along line 2—2 of FIG. 1.

Bevel gear 40 is a compound assembly comprised of two nesting and closely fitting sections 42 and 44, hereinafter referred to as outer and inner gears. To facilitate manufacture, two bevel gear blanks, suitably shaped and sized are temporarily secured to each other by means of a set screw or other suitable means, not shown. This retainer is discarded once the desired tooth form is generated and the finished bevel gear 40 is produced. The two sections with teeth formed on a common, coplanar face (FIG. 2) are separated for purposes to be described later. Considering outer gear 42 for the moment, there is formed therein an enlarged longitudinal bore 46 on the right hand or tooth side. Bore 46 terminates in a seat or shoulder 48. Another longitudinal bore 50 is provided which is concentric with bore 46 and extends from the shoulder 48 to the left hand surface 52 of gear 42 as seen in FIG. 1. Gear 42 is provided with a piloting diameter 53 for the fastening of a spur gear S, which will connect the differential assembly, by means of a suitable gear train, to the utilization device. Finally, there is formed an aperture 54 extending between shoulder 48 and surface 52 with its longitudinal axis substantially parallel to bores 46 and 50.

Referring now to inner gear 44, there are shown concentric diameters 60, 62, 64 and 66 substantially parallel to bores 46 and 50 of outer gear 42. Diameters 60 and 62 mate with bores 46 and 50 of outer gear 42 and are dimensioned such that the respective tolerances are consistent with standard manufacturing practices which afford easy assembly and disassembly and only slight relative angular motion between the two parts. Diameter 66 serves to mount bearings 68 which assure low friction rotation of the entire bevel gear assembly 40 about shaft 12. Diameter 64, in co-operation with rear face 70 and shoulder 48, define an annular channel 71. Completing the essential elements of inner gear 44 is an aperture 72 extending from the surface 70 to the right hand side or tooth surface of inner gear 44. The longitudinal axis of aperture 72 is substantially parallel to concentric diameters 60, 62, 64 and 66. The function of this aperture, as well as aperture 54, will now be described.

Figure 3:
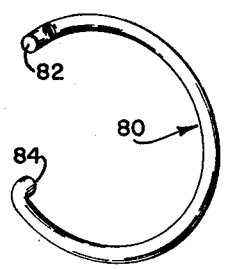
FIG. 3 is an enlarged pictorial showing of the resilient biasing means of this invention.

At assembly, outer and inner gears 42 and 44 are brought together, and in the annular chamber 71 formed between spaced surfaces 48 and 70, there is placed the torsion spring 80 illustrated in FIG. 3. Spring 80 describes a substantially circular arc of approximately 270° having end portions 82 and 84 formed at right angles to the plane of the spring. The end portions are sufficiently long to permit insertion into apertures 54 and 72 of outer and inner gears 42 and 44, respectively.

Outer and inner gears 42 and 44 are maintained in proper axial relation by means of washers 87, shim 88, if necessary, and retaining ring 89. The assembly is completed by shims or spacer washers 90 and retaining ring 92 which accurately position bevel gear assembly 40 on shaft 12 and assures a proper meshing relation with bevel pinion 20.

In operation, spring 80 biases nesting outer and inner gears 42 and 44 in opposite angular directions. Thus, any given compound tooth of bevel gear assembly 40 will be moved from its nominal or generated in-line position (FIG. 2) by the action of spring 80 so that each half (one-half on outer gear 42 and one-half on inner gear 44) is angularly closer to the adjacent tooth on its counterpart. Considering, for the moment, only one tooth of bevel pinion 20 and the two teeth of bevel gear 40 which surround it when in mesh, it will be evident that the displacement of outer gear 42 with respect to inner gear 44 is limited to the exact width of the mating bevel pinion 20 tooth. In other words, spring 20 will urge outer and inner gears 42 and 44 in opposite directions until one tooth of outer gear 42, displaced clockwise, engages one side of a given bevel pinion 20 tooth at its outer end. Concurrently, on the opposite side of the same bevel pinion tooth 20, at its inner end, it is engaged by the adjacent tooth of inner gear 44 which has been displaced counterclockwise by spring 80. It may be seen then, that regardless of any manufacturing deviations, there will be zero backlash for the life of the assembly. Additionally, there is no need for any adjustments since the torsion spring 80 continuously compensates for any variations in tooth form.

There has been disclosed heretofore the best embodiment of the invention presently contemplated and it is to be understood that various changes and modifications may be made by those skilled in the art without departing from the spirit of the invention.

What is claimed is:

1. A self-adjusting, self-compensating anti-backlash differential of miniature size and precision construction comprising:
   a rotatable shaft;
   a pair of bevel gears loosely mounted on said shaft for angular displacement thereabout, said gears being restrained against axial movement relative to said shaft, said gears being disposed in spaced relation to each other;
   a second shaft fixedly carried by said rotatable shaft and intermediate to said pair of bevel gears, said first and second shafts being disposed at substantially right angles to each other;
   a bevel pinion rotatably disposed on said second shaft and adapted to mesh with both of said pair of bevel gears;
   each of said bevel gears being formed of first and second closely nested sections coaxially disposed in tandem on said first shaft, said first and second sections of each gear having a common coplanar bevelled face with gear teeth formed on each of said respective sections, said teeth being in registry in the assembled condition to define a unitary bevel gear configuration, said first and second sections of each gear being angularly displaceable relative to each other to thereby displace the teeth of said first section out of registry with the teeth of said second section;
   a spring member mounted in spaced relation between said first and second sections, one terminal of said spring member being secured to said first section, the second terminal of said spring member being secured to said second section, said first and second terminals being angularly spaced from each other on a diameter smaller than the outside diameter of said nested bevel gears, said spring member in the unstressed condition being adapted to maintain the teeth of said first section out of registry with the teeth of said second section;
   said differential in the assembled condition having said bevel pinion in meshed relation with said first and second sections to thereby maintain said teeth in said first and second sections in registry and to thereby preload said spring member, said preloading being adapted to urge said teeth portions of said first and second sections into respective clockwise and counter clockwise angular abutment with mating adjacent teeth of said pinion to thereby minimize backlash.

2. A device as in claim 1 wherein said first and said second sections of each of said bevel gears are disposed in generally overlapping relation to define a nested unitary structure in the assembled condition, said structure being formed with a hollow portion therein transverse to the axis of said first shaft, said hollow portion defined by confronting spaced portions of said first and second sections, said first and second sections being formed with respective apertures communicating with said hollow portion, said spring member being disposed in said hollow portion and having one terminal portion secured in said first aperture and the other terminal portion secured in said second aperture, to thereby maintain the respective teeth portions of said first and second sections in preselected nonregistry.

3. A device as in claim 2 wherein said spring member is a torsion spring of substantially arc-like configuration, provided with relatively short end portions formed at right angles to the plane of said spring member, said end portions being adapted to register with said respective apertures.

4. A device as in claim 2 wherein said hollow portion is an annular chamber formed between confronting spaced surfaces of said first and second sections of each bevel gear.

5. A device as in claim 4 wherein said first section, defined as an outer gear portion, is provided with an enlarged longitudinal bore on the tooth side, said bore terminating in a shoulder defining a first side wall, said first section further provided with a second bore concentric with the first bore and extending through said shoulder to the opposite side of said outer gear portion, said gear further provided with a piloting diameter for the fastening of a spur gear adapted to be connected to a utilization device, said outer gear being provided with an aperture formed in said first side wall, and wherein said second section, defined as an inner gear member, is provided with concentric first and second diameter portions adapted to register respectively with said first and second bore portions of said first section, the annular surface between said first and second diameters defining a second side wall, said first and said second side walls in the assembled relation forming said annular chamber adapted to house said spring member, said second section provided with a second aperture formed in said second side wall, said first and second apertures adapted to retain the said terminal portions of said spring member.

References Cited in the file of this patent

UNITED STATES PATENTS

| 794,224 | Hill | July 11, 1905 |
| 2,680,972 | Tone | June 15, 1954 |

FOREIGN PATENTS

| 473,246 | France | Sept. 14, 1914 |

OTHER REFERENCES

"18 Ways to Control Backlash in Gearing," article appearing in Product Engineering, issue of October 26, 1959, by Frederick T. Gutmann, pages 71–75 inclusive.